March 27, 1962

V. L. SCOTT 3,027,189

COLLAPSIBLE SHELTER

Filed Aug. 14, 1959

INVENTOR.
VICTOR L. SCOTT,
BY McMorrow, Berman + Davidson
ATTORNEYS

March 27, 1962 V. L. SCOTT 3,027,189
COLLAPSIBLE SHELTER
Filed Aug. 14, 1959 2 Sheets-Sheet 2
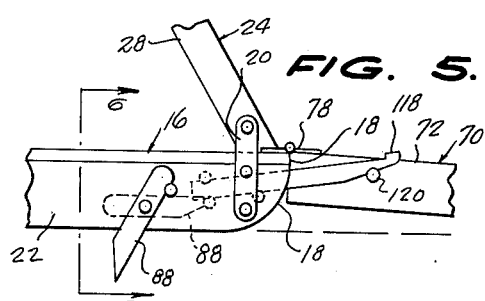
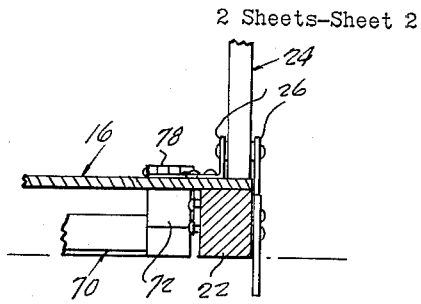
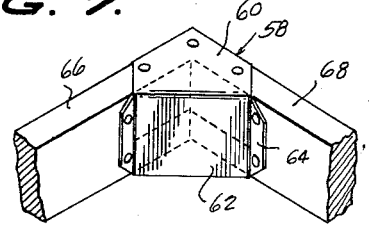
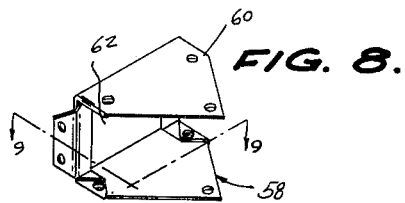
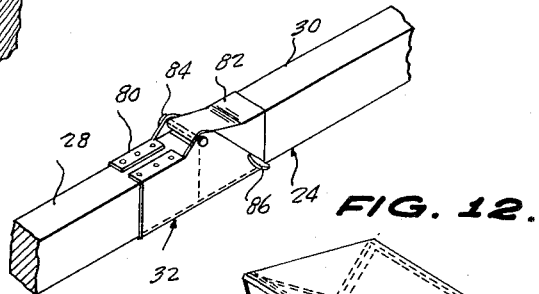
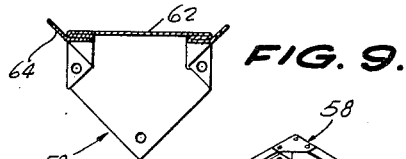
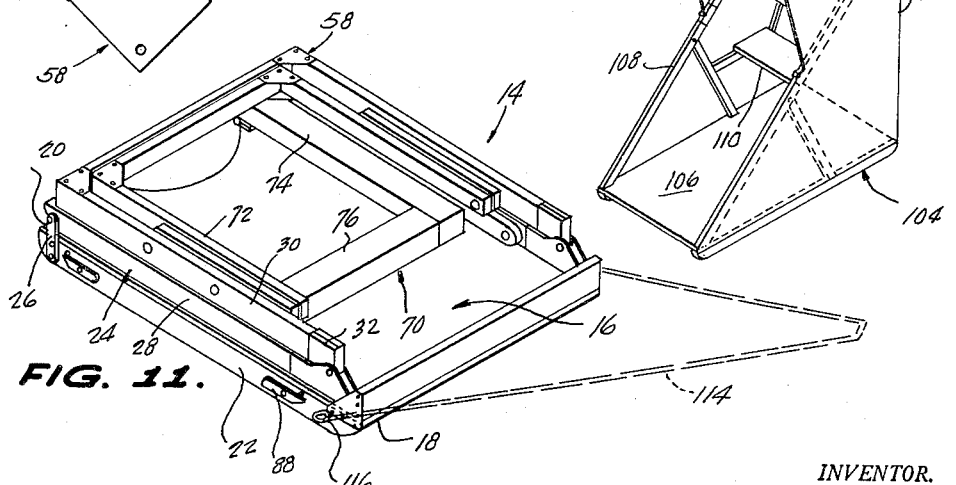
INVENTOR.
VICTOR L. SCOTT,
BY
McMorrow, Berman & Davidson
ATTORNEYS.

United States Patent Office 3,027,189
Patented Mar. 27, 1962

3,027,189
COLLAPSIBLE SHELTER
Victor L. Scott, 3105 Torrey Beach Drive, Fenton, Mich.
Filed Aug. 14, 1959, Ser. No. 833,714
4 Claims. (Cl. 297—184)

The present invention relates to a collapsible shelter such as is employed for protecting an individual from the elements while the individual fishes through ice on a body of water.

Presently employed are shelters for fishermen while fishing through the ice on a body of water, the shelters being constructed in many sizes and from many materials and each being intended for ready portability and transport to and from the body of water. Many such shelters are constructed so as to collapse to sled form for pulling over the surface of the ice to the selected location for fishing. Generally such shelters fail to meet the requirements for ready portability to and from the body of water and are cumbersome and difficult to erect and to dismantle. Others of such contemplated shelters are too bulky when collapsed to be easily and with facility stored in the trunk compartment of an automobile.

An object of the present invention is to provide a collapsible shelter which when collapsed is of a size readily stored within the trunk compartment of an automobile.

Another object of the present invention is to provide a collapsible shelter which lends itself to erection with ease and facility and by a single individual.

A further object of the present invention is to provide a collapsible shelter which is light in weight, one having runners for transport over the surface of a body of ice, one sturdy in construction and simple in structure, and one which is economically feasible.

These and other objects and advantages of the present invention will be fully apparent from the following description when taken in conjunction with the annexed drawings, in which:

FIGURE 5 is a detail view of one of the runners employed with the shelter of the present invention, portions of the runner and support and a portion of the forwardly extending open frame being broken away;

FIGURE 6 is a view taken on the line 6—6 of FIGURE 5;

FIGURE 7 is a fragmentary isometric view of one of the corners of the frame of the shelter, showing the employment of an improved form of brace;

FIGURE 8 is an isometric view of the brace employed in FIGURE 7;

FIGURE 9 is a view taken on the line 9—9 of FIGURE 8;

FIGURE 10 is an isometric view of the hinged joint connecting the upper and lower portions of one of the supports of the shelter;

FIGURE 11 is an isometric view of the shelter in collapsed condition, a rope being shown in dotted lines attached to the rearward end for pulling the shelter on the surface of a body of ice; and FIGURE 12 is an isometric view of a modified form of the shelter according to the present invention.

Figure 1:
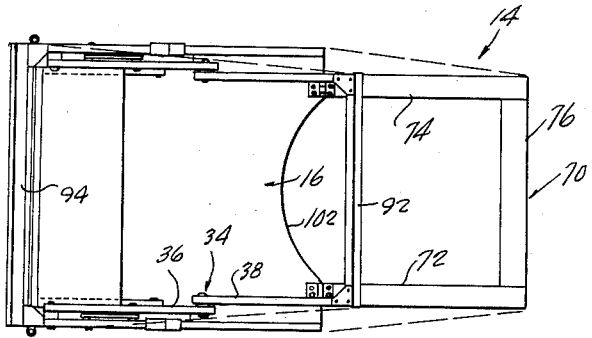
FIGURE 1 is a top plan view of the shelter of the present invention in the erected condition.
Figure 4:
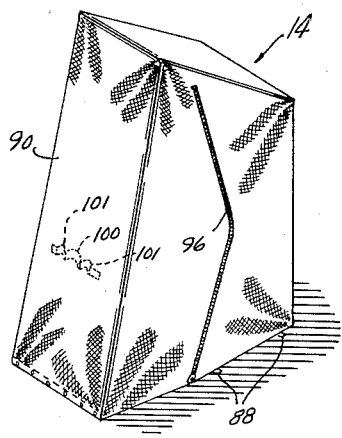
FIGURE 4 is an isometric view of the shelter, on a reduced scale, shown with the covering in closed position.

Referring in greater detail to the drawings in which like numerals indicate like parts throughout the several views, the collapsible shelter according to the present invention is shown in FIGURES 1 to 4 in erected condition and in FIGURE 11 in collapsed condition, the shelter being designated generally by the reference numeral 14. The shelter 14 includes a floor 16 having a front end 18 and a rear end 20. Along each side edge of the floor 16 is a runner 22 having its ends curved, as shown in FIGURE 5.

A pair of support members 24 are arranged in a sloping direction and are positioned upon the floor 16 so that their lower ends are adjacent the front end 18 of the floor and the upper ends are spaced above and adjacent the rear end 20 of the floor.

Means, embodying a pair of hinged straps 26 for each support member 24, connects each support member 24 to the floor 16 and runner 22 for pivotal movement of the support member 24 from the upwardly sloping position to the nested collapsed position shown in FIGURE 11.

Each support member 24 is fabricated of two sections 28 and 30 hingedly secured together at their one ends by a hinge structure 32, as shown in FIGURE 10.

An arm 34 extends in an outstretched position and is disposed between the portion of each of the upper sections 30 of the support members 24 adjacent the upper end and the front end 18 of the floor 16. Each arm 34 is fabricated of two parts 36 and 38 hingedly connected together at their one ends with the part 36 having its other end pivotally connected to the adjacent support member section 30 inwardly of and spaced from the upper end of the latter for movement from the outstretched position to a position in collapsed relation with respect to the adjacent support member 24.

Figure 2:
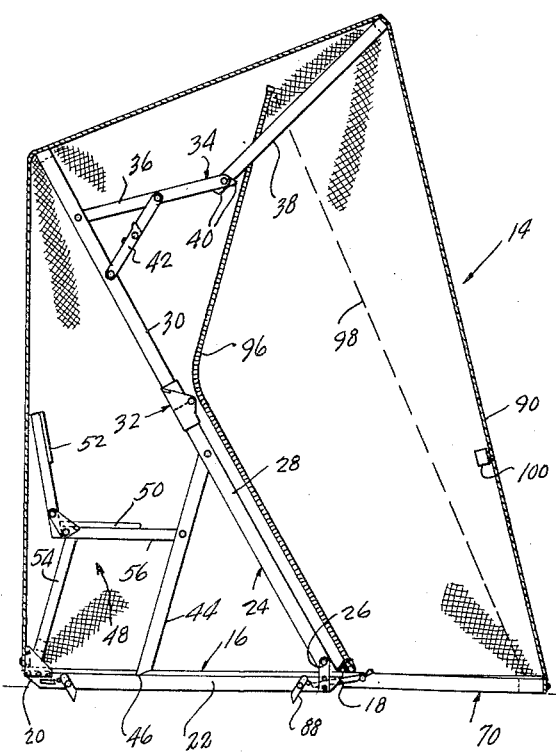
FIGURE 2 is an elevational view with the covering of the shelter cut away along one side.
Figure 3:
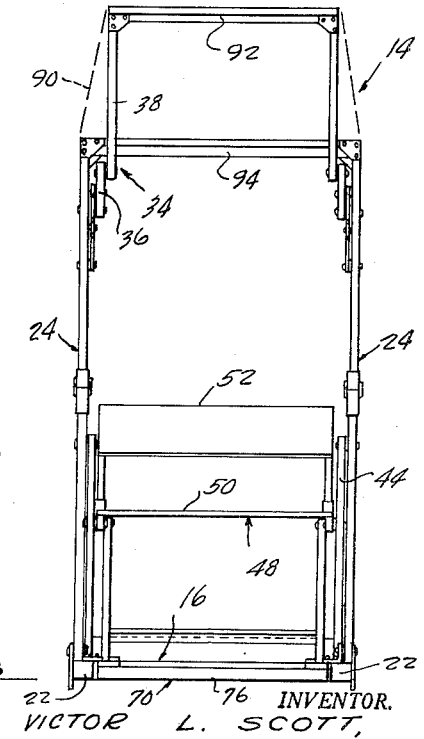
FIGURE 3 is a front elevational view of the covering removed but indicated in dotted lines.

The confronting and pivotally connected ends of the arm sections 36 and 38 are provided with keepers, as at 40 in FIGURE 2, engaging the opposite section and preventing their movement from the slightly angled outstretched position further in the clockwise direction relative to each other. Such construction is conventional and not here further detailed for reasons of simplicity.

A brace 42, similarly provided with keepers, extends between the support section 30 and the midpart of the arm section 36 and serves, when in the position shown in FIGURE 2, to hold the arm sections 36 and 38 in the outstretched position.

A brace element 44 is arranged in a sloping direction and is positioned upon the floor 16 between the portion of each support member 24 adjacent the lower end and the rear end 20 of the floor 16. The upper end of each brace element 44 is pivotally connected to the adjacent support member section 28 at a point spaced below and adjacent the hinge structure 32. The hinge connection of the brace element 44 to the adjacent support member 24 permits its movement from the upright position to a collapsed position relative to the support member 24. The lower end of each brace element 44 rests upon the floor 16 which may be notched, as at 46 in FIGURE 2, to receive the brace element 44.

A seat structure, designated generally by the reference numeral 48, is positioned upon the floor 16 between the brace elements 44 and the rear end 20 of the floor 16 and is connected to the floor 16 and to the brace elements 44 for movement to a collapsed position when the brace elements 44 have executed their movements to the collapsed positions. The seat structure 48 includes a horizontally disposed seat 50 and a back 52 rising from the seat 50. A pair of back legs 54 are pivotally connected to the rear end of the seat 50 and have their lower ends pivotally connected to the adjacent parts of the floor 16. The seat back 52 is pivotally connected to the side rails 56 of the seat structure 48 for movement on the upright position to a position folded down upon the seat 50, such movement being indicated by an arrow in FIGURE 2. The forward ends of the side rails 56 are pivotally connected to the brace elements 44 so that when the latter is moved in the direction indicated by the arrow in FIGURE 2, the back legs 54 and side rails 56 collapse to an aligned position substantially parallel to the floor 16 and resting thereon between the collapsed support sections 28 and 30.

An important feature of the present invention is illustrated in FIGURES 7 to 11 and consists in a corner brace 58 fabricated of rigid sheet metal, plastic or the like. The corner brace 58 has two horizontally disposed plate members 60 arranged in vertical spaced relation and joined together along their complemental one ends by a vertically disposed backing member 62. The opposed ends of the backing member 62 are folded back upon themselves, as shown in FIGURE 9, to form ears 64 which are arranged at right angles with respect to each other. In the securement of a corner brace 58 in the frame of the shelter 14, as shown in FIGURE 7, the plate members 60 overlie and underlie the junction of two frame pieces 66 and 68, the backing member 62 bridges the corner, and the ears 64 lie parallel and are secured to the inner faces of the pieces 66 and 68. Suitable fastening elements such as nails or screws are used to secure the ears 64 and the plate member 60 to the adjacent parts of the pieces 66 and 68.

A horizontally disposed open frame 70 is positioned forwardly of the front end 18 of the floor 16 and has one end connected to the floor 16 for movement from the horizontal position to a position in which the other end is above and spaced from the floor 16. The hollow frame 70 is shown most clearly in FIGURE 1 and consists in side members 72 and 74 joined at their complemental one ends by an end member 76. As shown in FIGURE 5, with respect to the side member 72, hinges 78 connect the other complemental ends of the side members 72 and 74 to the front end 18 of the floor 16.

Referring again to FIGURE 10, the hinge structure 32 is seen to consist of a pair of box members 80 and 82 receiving the adjacent portion of the support member sections 28 and 30 and hingedly connected together by a pivot pin 84. A tab 86 projects outwardly from the one box member 82 and is fixedly secured by solder or other means to the latter. The tab 86 engages the adjacent edge of the extended portion of the box member 80 and limits the pivotal movement of the sections 28 and 30 relative to each other.

On the exterior face of each runner 22 are a pair of oppositely arranged spur members 88, each pivotally connected to the runner 22 for swinging movement from the full line position to the dotted line position in FIGURE 5.

A covering 90 extends over and is supported by the free ends of the arm sections 38 and a top piece 92 which extends between the free ends of the sections 38. The covering 90 is also supported upon the upper ends of the support member sections 30, there being a top piece 94 extending between the upper ends of such sections 30. The covering 90 encloses the support members 24, the braces 44, and the arms 34, and also encloses the seat structure 48 and the frame 70. The free edge of the covering 90 is secured to the perimeter of the floor 16 rearwardly of the front end 18 and to the portion of the perimeter of the frame 70 forwardly of the front end 18 of the floor 16. One or other of the sides of the shelter 14, or both if desired, may be provided with a zipper 96 in the covering 90 for ingress and egress into the shelter 14. Preferably, the zipper 96 is arranged in two straight sections angled with respect to each other, as shown in FIGURE 2. This permits folding of the zipper flap along a fold line substantially as indicated by a dotted line 98 in FIGURE 2. The construction of the zipper is conventional and not detailed here as not being a part of the present invention.

A handle 100 is provided on the inner surface of the covering 90 at a point immediately forward of the seat 50 so that upon grasping of the handle 100 and the application of a manually applied pulling force thereto, the frame 70 may be lifted from the ice surface from the horizontal position to an upwardly sloping or vertical position, permitting the throwing of fish forwardly of the shelter 14 as the fish are removed through the hole in the ice over which the shelter 14 has been positioned. The forward edge of the floor 16 is arcuately curved, as at 102 in FIGURE 1, affording easy access to an occupant of a seat 50 of a hole in the ice when the shelter 14 is positioned so that the frame 70 is circumposed about such ice hole. Loops 101 on each side of the handle 100 are adapted to receive therethrough fishing poles or the like when the shelter is erected for fishing.

In FIGURE 12, a modified form of the shelter is shown and is designated generally by the reference numeral 104, the shelter 104 having a floor 106, supports 108 rising from the floor 106, a seat 110, and a covering 112. With the exception of the portion of the covering which extends from the upper front end of the shelter 104 to the floor 106, the structure of the shelter 104 is substantially the same as heretofore described with reference to the shelter 14.

In use, a rope 114, shown in dotted lines in FIGURE 11, may have its ends attached to eye formations 116 provided in the rearward end of the runners 22 and the folded and collapsed shelter 14 may be transported on the surface of a body of ice to the selected location. As will be seen in FIGURE 11, all of the components of the frame of the shelter 14 fold easily to a nested position within the perimeter of the floor 16 from which nested position they are erected with ease and facility by a single individual with or without the covering 90 encompassing the same. When in the erected position, the shelter 14 may be positioned over and adjacent a hole in the ice for fishing therethrough with the occupant of the shelter seated comfortably upon the seat 50 and with his feet resting upon the portions of the floor 16 forwardly of the seat 50. A slidable wedge-type latch 118 (FIGURE 5) on each side of the frame 70, or one side if preferred, secures the frame 70 in the horizontal position against inadvertent or accidental raising of the same by the wind. The latch 118 normally engages a pin 120 projecting outwardly of the adjacent frame side member 72, 74 and is easily and quickly withdrawn when it is desired to raise the frame 70 from the horizontal position.

What is claimed is:

1. In a collapsible shelter, a floor having front and rear ends, a pair of support members arranged in a sloping direction positioned upon said floor so that the lower ends are adjacent the front end of said floor and the upper ends are spaced above and in the same vertical plane as the rear end of said floor, means pivotally connecting the lower ends of said support members to said floor, an arm extending in an outstretched position disposed between the portion of each of said support members adjacent the upper end and the front end of said floor and connected to the adjacent support member upper end portion for movement from the outstretched position to a collapsed position with respect to said adjacent support member, and a brace element arranged in a sloping direction positioned upon said floor between the portion of each support member adjacent the lower end thereof and the rear end of said floor and having the upper end pivotally connected to the adjacent support member lower end portion for movement from the sloping position to a collapsed position relative to the adjacent support member lower end portion and having the lower end resting upon said floor.

2. In a collapsible shelter, a floor having front and rear ends, a pair of support members arranged in a sloping direction positioned upon said floor so that the lower ends are adjacent the front end of said floor and the upper ends are spaced above and in the same vertical plane as the rear end of said floor, means pivotally connecting the lower ends of said support members to said floor, an arm extending in an outstretched position disposed between the portion of each of said support members adjacent the upper end and the front end of said floor and connected to the adjacent support member upper end portion for movement from the outstretched position to a collapsed position with respect to said adjacent support member, a brace element arranged in a sloping direction positioned upon said floor between the portion of each support member adjacent the lower end thereof and the rear end of said floor and having the upper end pivotally connected to the adjacent support member lower end portion for movement from the sloping position to a collapsed position relative to the adjacent support member lower end portion and having the lower end resting upon said floor, and a seat structure including a horizontally disposed seat and a back rising from said seat positioned upon said floor between said brace elements and the rear end of said floor and connected to said floor and said brace elements for movement to a collapsed condition when said brace elements have executed their movement to collapsed positions.

3. In a collapsible shelter, a floor having front and rear ends, a pair of support members arranged in a sloping direction positioned upon said floor so that the lower ends are adjacent the front end of said floor and the upper ends are spaced above and in the same vertical plane as the rear end of said floor, means pivotally connecting the lower ends of said support members to said floor, an arm extending in an outstretched position disposed between the portion of each of said support members adjacent the upper end and the front end of said floor and connected to the adjacent support member upper end portion for movement from the outstretched position to a collapsed position with respect to said adjacent support member, a brace element arranged in a sloping direction positioned upon said floor between the portion of each support member adjacent the lower end thereof and the rear end of said floor and having the upper end pivotally connected to the adjacent support member lower end portion for movement from the sloping position to a collapsed position relative to the adjacent support member lower end portion and having the lower end resting upon said floor, and a horizontally disposed open frame positioned forwardly of the forward end of said floor and having one end connected to said floor for swinging movement from the horizontal position to a position in which the other end is above and spaced from said floor.

4. A collapsible shelter comprising a floor having front and rear ends, a pair of support members arranged in a sloping direction positioned upon said floor so that the lower ends are adjacent the front end of said floor and the upper ends are spaced above and in the same vertical plane as the rear end of said floor, means pivotally connecting the lower ends of said support members to said floor, an arm extending in an outstretched position disposed between the portion of each of said support members adjacent the upper end and the front end of said floor and connected to the adjacent support member upper end portion for movement from the outstretched position to a collapsed position with respect to said adjacent support member, a brace element arranged in a sloping direction positioned upon said floor between the portion of each support member adjacent the lower end thereof and the rear end of said floor and having the upper end pivotally connected to the adjacent support member lower end portion for movement from the sloping position to a collapsed position relative to the adjacent support member lower end portion and having the lower end resting upon said floor, a seat structure including a horizontally disposed seat and a back rising from said seat positioned upon said floor between said brace elements and the rear end of said floor and connected to said floor and said brace elements for movement to a collapsed condition when said brace elements have executed their movement to collapsed positions, and a covering enclosing said support members, said arms, said seat structure, and said brace elements and having the free edges detachably secured to said floor.

References Cited in the file of this patent
UNITED STATES PATENTS

| | | |
|---|---|---|
| 1,198,831 | Fennelly | Sept. 19, 1916 |
| 1,827,477 | Kotausek | Oct. 13, 1931 |
| 2,473,076 | Scheibner | June 14, 1949 |

FOREIGN PATENTS

| | | |
|---|---|---|
| 207,714 | Germany | Mar. 9, 1909 |